US007309285B2

(12) United States Patent
Nordman et al.

(10) Patent No.: US 7,309,285 B2
(45) Date of Patent: Dec. 18, 2007

(54) GAMING DEVICE HAVING MULTIPLE TRANSVERSE ROTATING DISPLAYS

(75) Inventors: Dennis Nordman, Lake Villa, IL (US); James M. Gray, Reno, NV (US)

(73) Assignee: IGT, Reno, NV (US)

(*) Notice: Subject to any disclaimer, the term of this patent is extended or adjusted under 35 U.S.C. 154(b) by 456 days.

(21) Appl. No.: 10/658,996

(22) Filed: Sep. 9, 2003

(65) Prior Publication Data

US 2005/0054428 A1 Mar. 10, 2005

(51) Int. Cl.
*G06F 17/00* (2006.01)
*G06F 19/00* (2006.01)

(52) U.S. Cl. ............................ 463/31; 463/16; 463/17; 463/18; 463/19; 463/20; 463/30; 463/32; 463/33; 273/138.1; 273/141 R; 273/142 R; 273/142 A

(58) Field of Classification Search .................... 463/1, 463/16–34; 40/427–445, 493–507
See application file for complete search history.

(56) References Cited

U.S. PATENT DOCUMENTS 1,940,500 A * 12/1933 Lawrence .................... 40/432
2,545,644 A 3/1951 Benton et al.
3,135,063 A * 6/1964 Ricks .......................... 40/473
3,149,430 A * 9/1964 Lyubomir et al. ............ 40/447
3,326,552 A * 6/1967 Bilbao .......................... 463/51
3,486,261 A * 12/1969 Hardesty ..................... 40/546
3,610,918 A * 10/1971 Barlow ........................ 40/432
3,975,022 A 8/1976 Figueroa
4,175,345 A * 11/1979 Rutchik ....................... 40/473
4,410,178 A 10/1983 Partridge
4,695,053 A 9/1987 Vazquez, Jr. et al.
4,732,386 A 3/1988 Rayfiel
5,152,529 A 10/1992 Okada (Continued)

FOREIGN PATENT DOCUMENTS

EP 912685 12/1962

(Continued)

OTHER PUBLICATIONS

4DU Dice Unit Advertisement written by starpoint.uk.com, printed on Sep. 3, 2002.

(Continued)

*Primary Examiner*—Robert Pezzuto
*Assistant Examiner*—Milap Shah
(74) *Attorney, Agent, or Firm*—Bell, Boyd & Lloyd LLP

(57) ABSTRACT

A gaming device including a mechanical display device including a main housing and a plurality of movable symbol displays mounted in the main housing, wherein each of the symbol displays includes at least one symbol. The main housing includes a substantially horizontal first axis which extends from the rear of the housing to the front of the housing. Each of the symbol displays are positioned on a separate second axis, which each intersect and are transverse to the first axis. Upon a triggering event in a game, each of the symbol displays move about its second axis and then stop and display at least one symbol to a player. The gaming device indicates one of the displays symbols and provides the indicated symbol to the player.

45 Claims, 10 Drawing Sheets

U.S. PATENT DOCUMENTS 5,364,100 A 11/1994 Ludlow et al.
5,395,111 A 3/1995 Inoue
5,449,173 A 9/1995 Thomas et al.
5,560,603 A 10/1996 Seelig et al.
5,584,763 A 12/1996 Kelly et al.
5,664,998 A 9/1997 Seelig et al.
5,823,872 A 10/1998 Prather et al.
5,823,874 A 10/1998 Adams et al.
D400,597 S 11/1998 Hedrick et al.
D402,702 S 12/1998 Seelig et al.
5,848,932 A 12/1998 Adams
D406,865 S 3/1999 Heidel
5,882,261 A 3/1999 Adams
5,911,418 A 6/1999 Adams et al.
5,927,714 A 7/1999 Kaplan
5,976,015 A 11/1999 Seelig et al.
6,004,207 A 12/1999 Wilson, Jr. et al.
6,059,658 A 5/2000 Mangano et al.
6,086,066 A 7/2000 Takeuchi et al.
6,089,977 A 7/2000 Bennett
6,089,978 A 7/2000 Adams et al.
6,105,962 A 8/2000 Malavazos et al.
6,113,098 A 9/2000 Adams
6,142,873 A 11/2000 Weiss et al.
6,142,874 A 11/2000 Kodachi et al.
6,159,098 A 12/2000 Slomiany et al.
6,162,121 A 12/2000 Morro et al.
6,173,955 B1 1/2001 Perrie et al.
6,203,429 B1 3/2001 Demar et al.
D441,031 S 4/2001 Seelig et al.
6,213,876 B1 4/2001 Moore, Jr.
6,220,593 B1 4/2001 Pierce et al.
6,224,483 B1 5/2001 Mayeroff
6,227,970 B1 5/2001 Shimizu et al.
D443,313 S 6/2001 Brettschneider
6,241,607 B1 6/2001 Payne et al.
6,251,013 B1 6/2001 Bennett
6,254,481 B1 7/2001 Jaffe
6,267,669 B1 7/2001 Luciano, Jr. et al.
6,270,411 B1 8/2001 Gura et al.
6,302,790 B1 10/2001 Brossard
6,305,686 B1 10/2001 Perrie et al.
6,315,663 B1 11/2001 Sakamoto
6,336,863 B1 1/2002 Baerlocher et al.
6,340,158 B2 1/2002 Pierce et al.
6,368,216 B1 4/2002 Hedrick et al.
6,386,974 B1 5/2002 Adams
6,398,220 B1 * 6/2002 Inoue ..................... 273/142 R
6,413,162 B1 7/2002 Baerlocher et al.
6,419,579 B1 7/2002 Bennett et al.
6,461,241 B1 10/2002 Webb et al.
D465,531 S 11/2002 Luciano, Jr. et al.
6,481,713 B2 11/2002 Perrie et al.
6,491,298 B1 * 12/2002 Criss-Puszkiewicz et al. ... 273/148 R
6,533,660 B2 3/2003 Seelig et al.
6,537,152 B2 3/2003 Seelig et al.
6,582,307 B2 6/2003 Webb
6,609,972 B2 8/2003 Seelig et al.
6,644,663 B2 11/2003 Seelig et al.
6,676,511 B2 1/2004 Payne et al.
6,712,694 B1 3/2004 Nordman
6,793,577 B1 * 9/2004 Wilkins et al. ............... 463/16
2005/0059454 A1 3/2005 McComb et al.

FOREIGN PATENT DOCUMENTS

GB 2201821 A 9/1987
GB 2383668 A 11/2001
WO WO 93/03464 2/2003

OTHER PUBLICATIONS

American Bandstand Brochure written by Anchor Games, published in 2001.
Big Shot!™ Advertisement published by Aristocrat Technologies, Inc., published in 2002.
Big Top Keno Advertisement published by Aristocrat Technologies, Inc., published in 2000.
Bonus Roulette Brochure written by F. Franco, not dated.
Buck's Roulette Brochure written by R. Franco, not dated.
Chariot's of Fortune Brochure written by R. Franco, not dated.
Classic Pot of Gold Brochure written by Ace Coin Equipment Ltd., not dated.
Cyberdyne Gaming Brochure written by Cyberdyne Gaming, not dated.
Double Diamond Girls Advertisement, written by A.C. Coin and Slot Services Company, not dated.
Elvira® Mistress of the Dark™ Advertisement written by IGT, published in 2002.
Elvis Hits Advertisement written by IGT, published in 1999.
Holy Smoke Brochure written by Impulse Gaming Ltd., not dated.
Honeymooners Advertisement, written by AC Coin & Slot, published 2002.
Jack and the Beanstalk™ Brochure written by AC Coin & Slot, not dated.
Jackpot Hotline Advertisement, written by AC Coin and Slot, not dated.
King of the Grill™ Brochure written by AC Coin & Slot, not dated.
Lemons, Cherries and Bell-Fruit-Gum written by Richard M. Bueschel, pp. 39-41, 64, 70, 137, 149-150, 195-196 and 251, 1995.
Line-Up Brochure written by AC Coin & Slot, not dated.
Little Green Men Jr.™ Advertisement written by AC Coin & Slot, not dated.
Little Green Men Jr.™ Article written by Strictly Slots, published in Feb. 2003.
Miss America Brochure written by AC Coin & Slot, not dated.
Mix and Match Article written by Strictly Slots, published in Apr. 2002.
Mix and Match Advertisement published by AC Coin & Slot, not dated.
Money Grab Article written by Strictly Slots, published in Apr. 2001.
Monster Match Game Description by Strictly Slots, published by AC Coin & Slots prior to Sep. 9, 2003.
Monster Match Advertisement by Strictly Slots, published prior to Sep. 9, 2003.
Monster Match Article, published by Strictly Slots, published in Jan. 2002.
On The Money! Article written by Strictly Slots, published in Dec. 2000.
Payout!™ Advertisement written by www.csds.com/Gaming/Products/g_Payout.htm, printed on Jan. 15, 2001.
Payout!™ Article written by Casino Data Systems, not dated.
Pick a Prize Brochure written by Acres Gaming Incorporated, published prior 2001.
Power Slotto Brochure published by AC Coin & Slot prior to 2002.
Press Your Luck Brochure published by AC Coin & Slot prior to 2002.
Quick Pick Paytime Brochure written by Acres Gaming Incorporated, published prior to 2001.
R&B™ Brochure published by AC Coin & Slot, not dated.
Reel Dice Advertisement written by Gerber & Glass, published in 1936.
Royal Roulette Brochure written by Impulse Gaming Ltd., not dated.
Slot Machine Buyer's Handbook, A Consumer's Guide to Slot Machines written by David L. Saul and Daniel R. Mead, published in 1998.
Silver City Roundup Brochure published by AC Coin & Slot, not dated.

Slot Machines A Pictorial History of the First 100 Years, 5th edition written by Marshall Fey, published in 1983-1997.

Slot Machines and Coin-Op Games written by Bill Kurtz, pp. 16, 65, 105 and 111, 1991.

Slot Machines on Parade, 1st edition written by Robert N. Geddes and illustrated by Daniel R. Mead, published in 1980.

Spin-A-Lot Brochure written by Acres Gaming Incorporated, published prior to 2001.

Take Your Pick Article written by Strictly Slots, published in Mar. 2001.

Yahtzee Bonus Advertisement written by Mikohn, published in 1999.

* cited by examiner

GAMING DEVICE HAVING MULTIPLE TRANSVERSE ROTATING DISPLAYS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Another way to enhance a player's enjoyment, entertainment and excitement with a gaming device is by including lights, sounds and other visual or audio or audio-visual effects in the gaming machines.

Certain known gaming devices use mechanical devices such as reels or wheels to enhance the attraction of the machines to players and also to enhance the player's game playing experience. These mechanical devices enable a player to see physical movements of a game, a portion of a game, or a functional game event or element which increases the player's enjoyment of the game.

For example, most known reel-type gaming devices include one set of one or more aligned mechanical reels, such as three to five reels, which rotate about a horizontal axis. The gaming device or player activates the set of reels to indicate symbol combinations on the reels. Other known gaming devices include a plurality of sets of reels. In these gaming devices, the sets of reels may rotate about the same horizontal axis or rotate about different parallel horizontal axes. Furthermore, other known gaming devices include a set of one or more aligned mechanical reels which rotate about a vertical axis. These set or sets of reels may be associated with a primary or base game or a secondary or bonus game of a gaming device. In addition, certain known gaming devices include one set of aligned reels which rotates about a horizontal axis in a base game and one set of reels which rotates about a vertical axis for the bonus game. The different sets of mechanical reels provides the player with different types of displays and thereby increases the player's excitement and enjoyment of the gaming devices.

To increase player enjoyment and excitement, it is desirable to provide new and different mechanical devices which operate in conjunction with primary or secondary games of wagering gaming devices.

SUMMARY OF THE INVENTION

One embodiment of the present invention is directed to a gaming device having a mechanical display or mechanical topper unit including a housing and a plurality of movable symbol displays mounted in the housing. In this embodiment, a substantially horizontal first axis extends from the rear of the housing to the front of the housing. Each of the symbol displays includes at least one symbol and is positioned on a separate second axis which each intersect and are transverse to the first axis. In one embodiment, at least two opposing symbol displays are positioned on the same axis.

In this embodiment, the opposing symbol displays may rotate in a clockwise direction about each second axis, a counter-clockwise direction about each second axis or in any combination of clockwise and counter-clockwise directions about each second axis. In another embodiment, at least two of the symbol displays are positioned on different second transverse intersecting axes.

In one embodiment, upon a triggering event in a game, each of the symbol displays simultaneously rotates about its respective second axis. The symbol displays may rotate at the same rotational rate or at different rotational rates. In one embodiment, the symbol displays stop rotating and display at least one symbol to a player. The symbol may represent an award, a value, a free spin, a free game, a game element or any other suitable outcome. In one embodiment, the gaming device provides one of the displayed outcomes to the player. In another embodiment, the gaming device provides a plurality of the displayed outcomes to the player. In a further embodiment, the gaming device provides all of the displayed outcomes to the player. For example in this last embodiment, if the symbols represent awards, the gaming device provides the sum of the awards associated with the symbol displayed on each of the symbol displays. As described above, the multiple moving symbol displays of the present invention provide a unique moving visual display which increases a player's excitement and enjoyment of the game.

In one embodiment, a symbol indicator is positioned adjacent to or in the center of the symbol displays and is movably connected to the housing. In this embodiment, the symbol indicator is positioned on the front of the housing to move or rotate about the first axis. In one embodiment, upon a triggering event in a game, each of the symbol displays rotates about its second axis, while the symbol indicator rotates about the first axis. The gaming device stops the rotation of the symbol displays to display at least one symbol on each of the symbol displays to a player. The gaming device then stops the symbol indicator adjacent to or indicating one of the symbol displays to indicate the displayed symbol on that symbol display. The outcome associated with the indicated symbol is provided to the player in the game. In one embodiment, the symbol displays rotate before the symbol indicator rotates in a game. In another embodiment, the symbol indicator rotates before the symbol displays rotate in the game. The symbol indicator adds a further moving display to the mechanical display and thereby further increases a player's excitement and enjoyment of the game. It should be appreciated that other suitable symbol indicators may be employed in accordance with the present invention.

In one embodiment, each of the symbol displays includes at least one illumination device which illuminates or lights the symbol displays before, during or after the game. Each of the illumination devices may include the same color lights, a plurality of different colored lights or all the symbol displays may include different colored lights. In one embodiment, the gaming device illuminates one of the symbol displays to indicate a displayed symbol on the symbol display. In another embodiment, the gaming device initially illuminates all of the symbol displays and deactivates or non-illuminates one of the symbol displays to indicate a symbol on the symbol display. Other various uses of the illumination devices may be employed in accordance with the present invention.

The present invention may be employed in a primary or base game, a secondary or bonus game or in any suitable game associated with a gaming device or in an attract or other mode of the gaming device.

It is therefore an advantage of the present invention to provide a gaming device including a plurality of movable symbol displays which are positioned on separate axes which each intersect and are transverse to a first or substantially horizontal axis associated with a housing of a gaming device.

Another advantage of the present invention is to provide a gaming device including a plurality of movable symbol displays, which are positioned on separate axes and each intersect and are transverse to a substantially horizontal axis associated with a housing of a gaming device, and a movable symbol indicator which moves about the horizontal axis to indicate a symbol on at least one of the symbol displays.

Additional features and advantages of the present invention are described in, and will be apparent from, the following Detailed Description of the Invention and the figures.

DETAILED DESCRIPTION OF THE INVENTION

Gaming Device and Electronics

Figure 1:
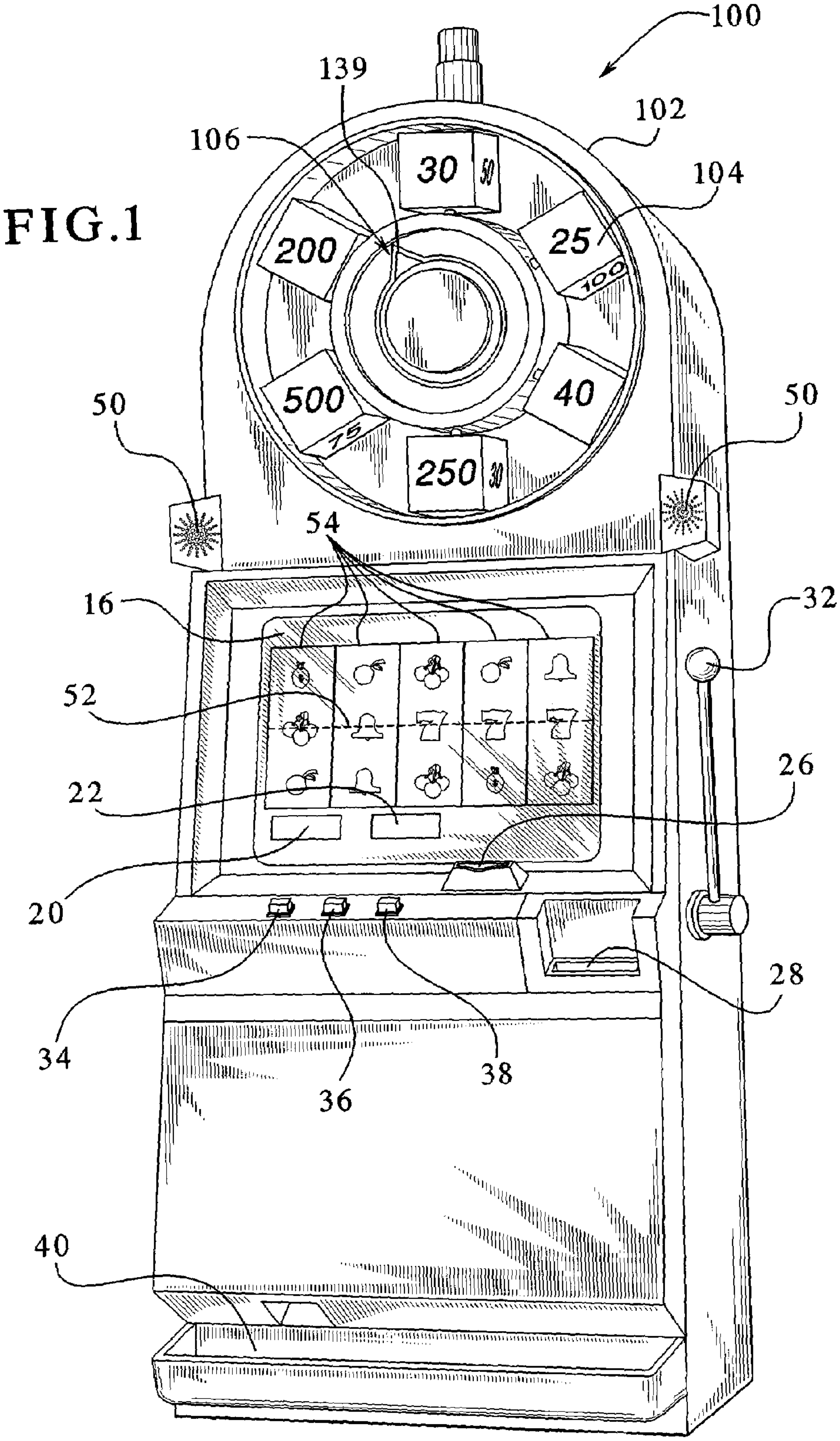
FIG. 1 is a front perspective view of the mechanical display device of one embodiment of the gaming device of the present invention.

Referring now to the drawings, one embodiment of the gaming device of the present invention is illustrated in FIG. 1 as gaming device 10. As illustrated in FIG. 1, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIG. 1, the gaming device can be constructed with varying cabinet and display configurations.

Figure 2A:
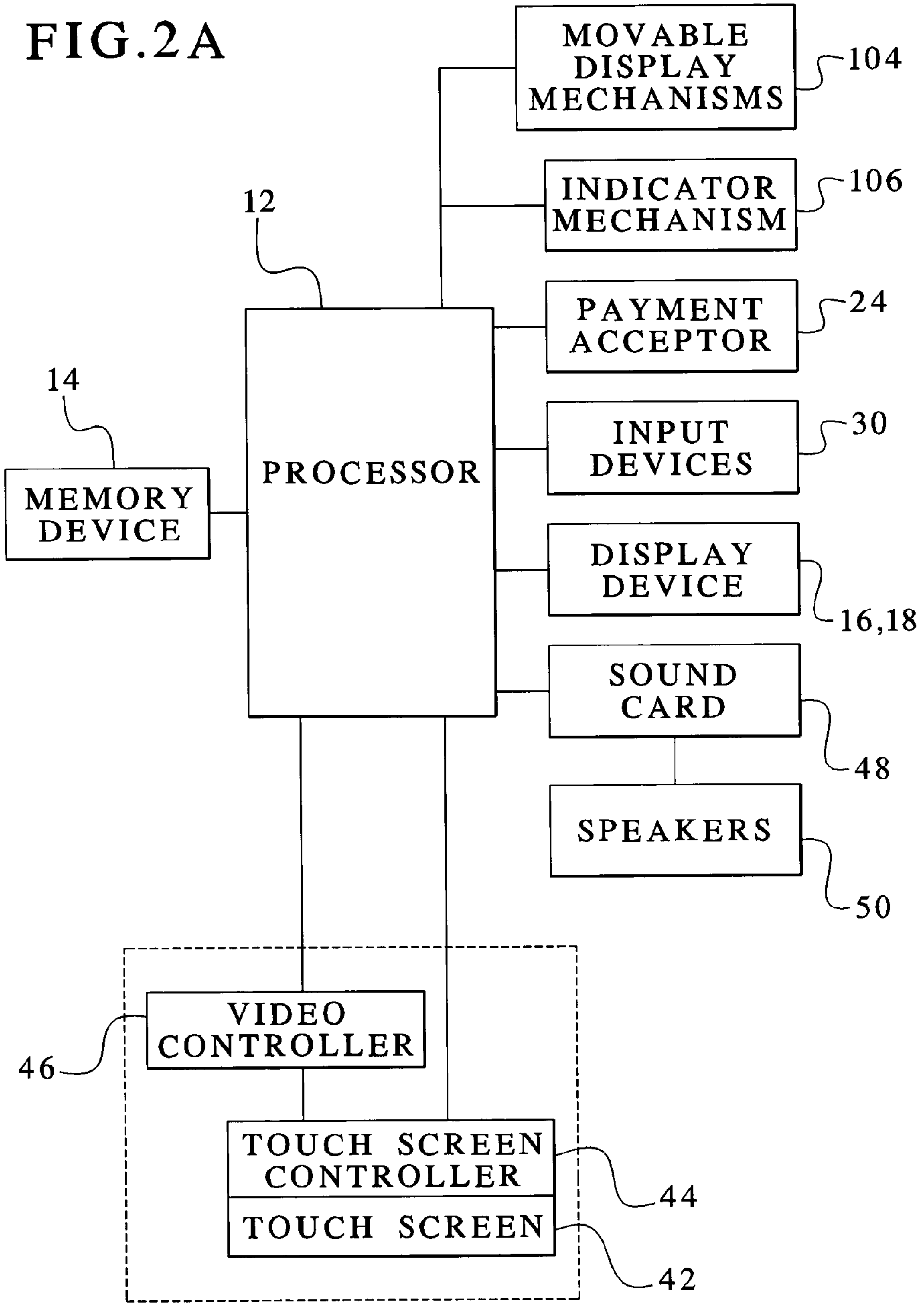
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a memory device, including, but not limited to, a suitable cartridge, disk or CD ROM. The processor and memory device may be collectively referred to herein as a "computer" or "controller." In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIGS. 1 and 2A, the gaming device includes at least one display device controlled by the processor. The display device is preferably connected to or mounted to the cabinet of the gaming device. The embodiment shown in FIG. 1 includes a central display device 16 which displays a primary game. This display device may also display any secondary game associated with the primary game as well as information relating to the primary or secondary game. The gaming device also includes a secondary such as the mechanical display device 100, which is mounted to or connected to the top of the cabinet of the gaming device. The mechanical display device 100 includes a plurality of rotatable display mechanisms 104 and a moveable indicator mechanism 106, which are controlled by the processor 12. Additionally, as seen in FIG. 1, in one embodiment, gaming device 10 includes a credit display 20 which displays a player's current number of credits, cash, account balance or the equivalent. In one embodiment, gaming device includes a bet display 22 which displays a player's amount wagered.

The display device may include, without limitation, a monitor, a television display, a plasma display, a liquid crystal display (LCD) a display based on light emitting diodes (L.E.D.) or any other suitable electronic device or display mechanism. In one embodiment, as described in more detail below, the display device includes a touch-screen with an associated touch-screen controller. The display device may be of any suitable configuration, such as a square, rectangle, elongated rectangle.

The display device of the gaming device is configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

As illustrated in FIG. 2A, in one embodiment, the gaming device includes at least one payment acceptor 24 in communication with the processor. As seen in FIG. 1, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1 and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIG. 1, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIG. 1, a base or primary game may be a slot game with one or more paylines 52. The paylines may be horizontal, vertical, circular, diagonal, angled, or any combination thereof. In this embodiment, the gaming device displays at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIG. 1. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
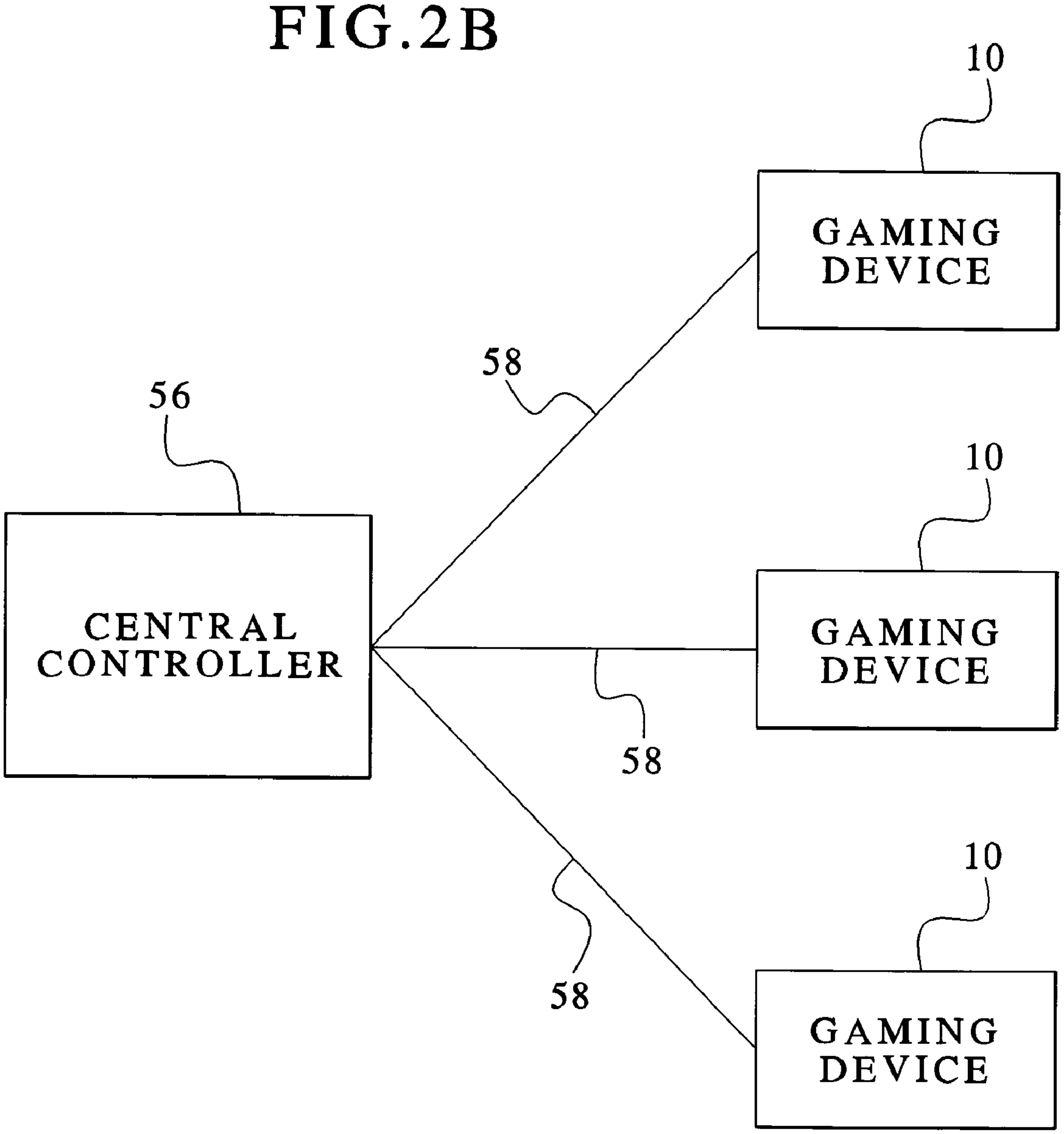
FIG. 2B is a schematic block diagram illustrating a plurality of gaming terminals and communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Multiple Rotatable Displays

Figure 3A:
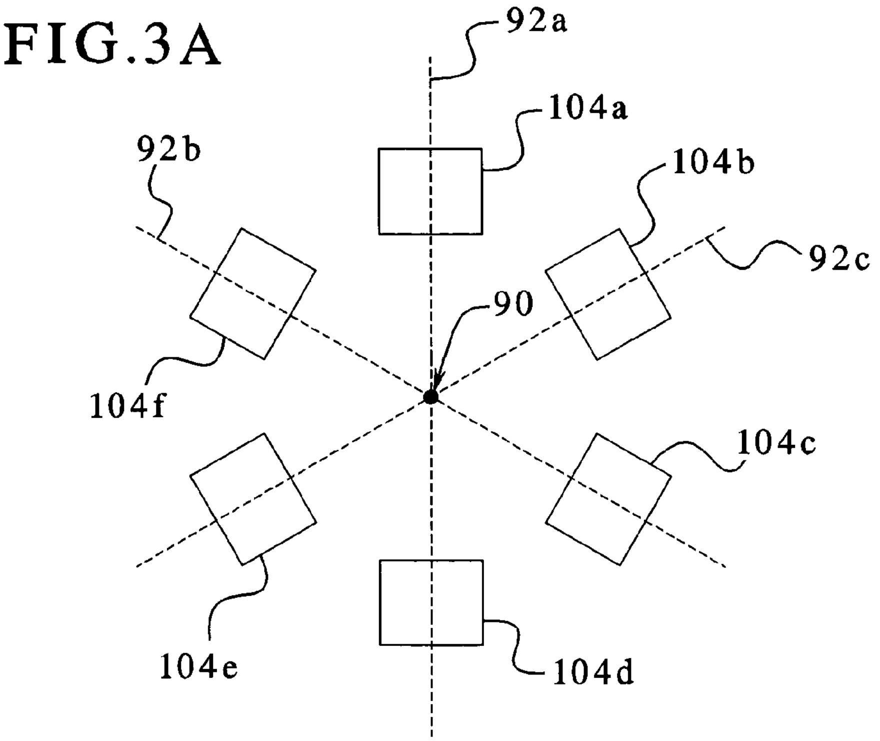
FIG. 3A is a schematic diagram of one embodiment of the present invention illustrating the positioning of opposing symbol displays on the same second axis and the transversely arranged symbol displays.
Figure 3B:
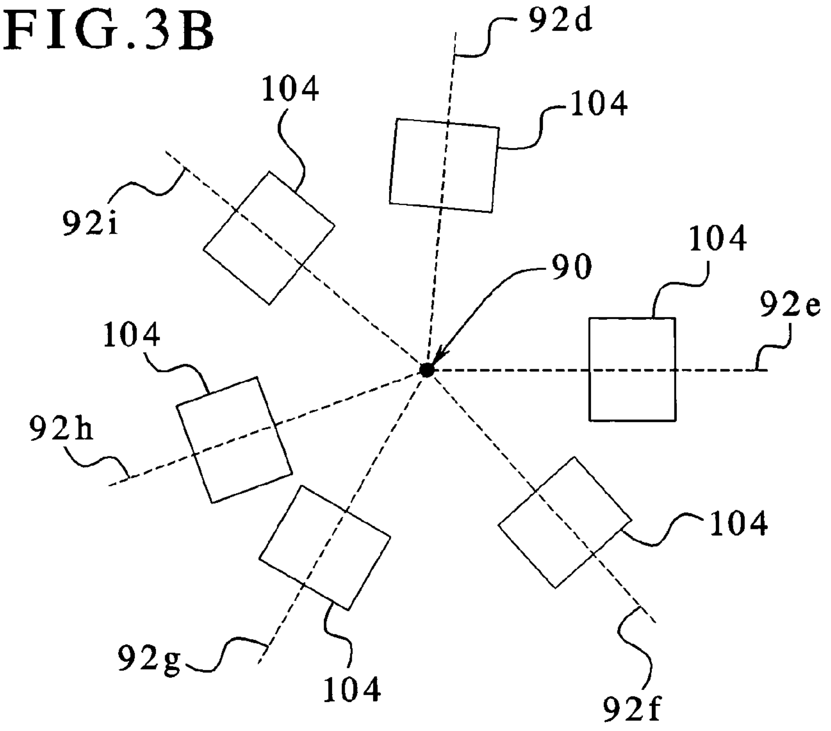
FIG. 3B is a schematic diagram of another embodiment of the present invention illustrating the positioning of each of the symbol displays on different second axes and the transversely arranged symbol displays.
Figure 4:
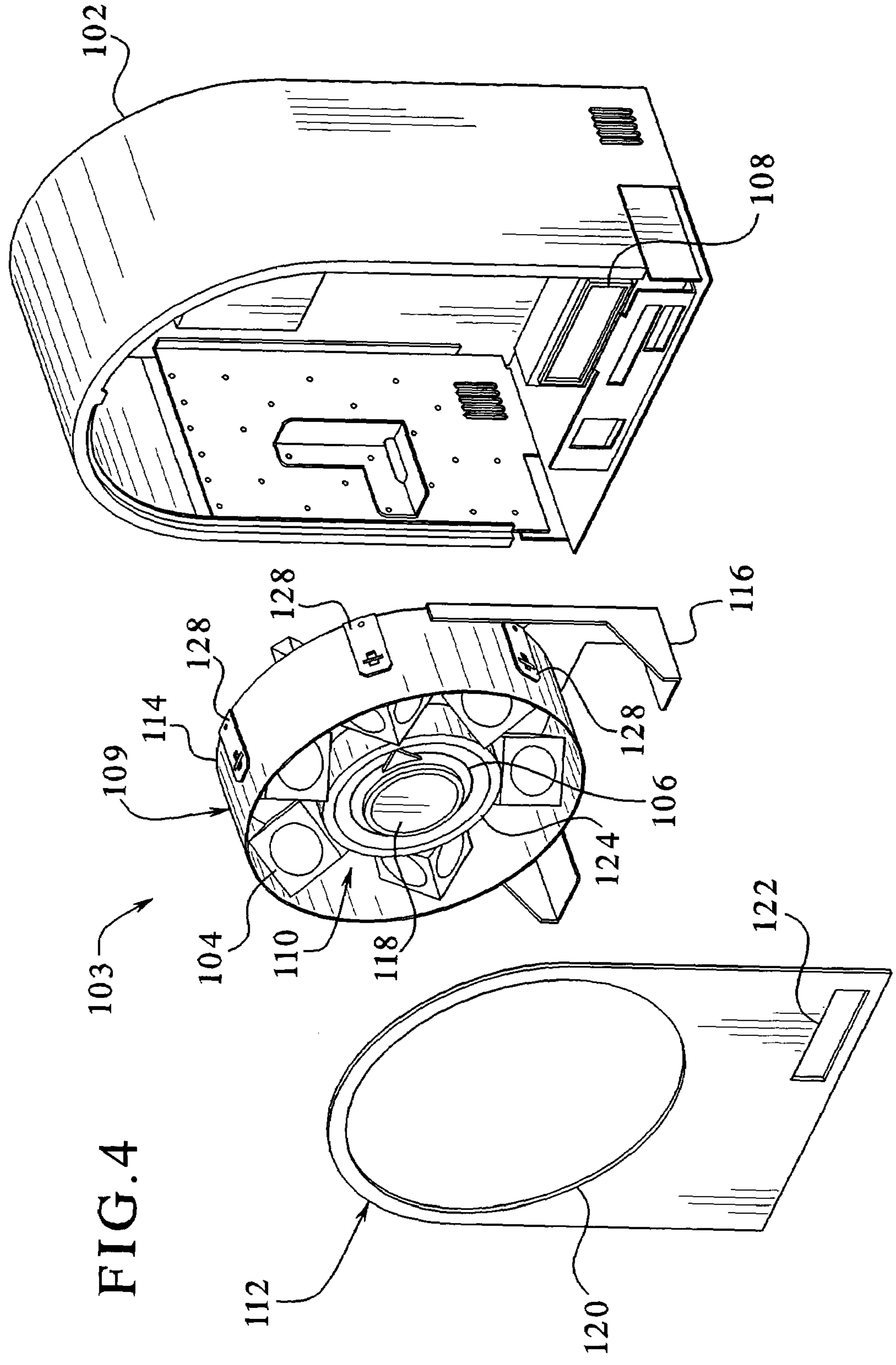
FIG. 4 is an exploded perspective view of the mechanical display device of one embodiment of the present invention.

Referring now to FIGS. 1, 3A and 3B, embodiments of the present invention are generally and schematically illustrated where the gaming device includes a main housing 100, and a plurality of movable symbol displays 104*a*, 104*b*, 104*c*, 104*d*, 104*e* and 104*f* mounted in the housing. The main housing 100 includes a substantially horizontal first axis 90 which extends from the rear of the housing to the front of the housing. Each of the symbol displays 104*a*, 104*b*, 104*c*, 104*d*, 104*e* and 104*f* includes at least one symbol and is positioned on a separate second axis which intersects and is transverse to the first axis. Additionally, the symbol displays are positioned generally in a circular pattern in the housing around the central indicator.

In one embodiment, upon a triggering event in a game, the gaming device causes each of the symbol displays to move or rotate about its second axis. As a player watches the plurality of symbol displays rotate in the game, the gaming device stops the symbol displays to display at least one symbol on each of the symbol displays to the player. The gaming device then provides an outcome associated with at least one of the symbols displayed on the symbol displays to the player. The symbols may represent awards, values, free spins, free games, game elements or any suitable outcome. As described above, the mechanical display of the present invention including multiple symbol displays rotating about axes which intersect and are transverse to a first axis such as a substantially horizontal axis associated with the gaming device, creates a exciting visual display which increases a player's excitement and enjoyment of the gaming device.

In one embodiment, a plurality of pairs of opposing symbol displays are positioned on the same second axis as shown in FIG. 3A. For example, opposing symbol displays 104*a* and 104*d* are positioned on the same second axis 92*a*. Opposing symbol displays 104*f* and 104*c* are positioned on the same second axis 92*b*. Similarly, opposing symbol displays 104*b* and 104*e* are positioned on the same second axis 92*c*. As shown in FIG. 3A, the substantially horizontal first axis 90 extends from the rear of the housing to the front of the housing where each of the second axes 92*a*, 92*b* and 92*c* intersect and are transverse to the first axis 90. In one embodiment, each pair of opposing symbol displays rotate in unison at the same rotational rate. In this embodiment, each pair of opposing symbol displays may rotate at the same rotation rate or at different rotational rates. In one embodiment, each of the symbol displays rotate in the same direction. It should be appreciated that the symbol displays may rotate in the same direction, different directions or in any suitable combination of directions.

In the embodiment illustrated in FIG. 3A, the symbol displays are equally spaced apart with respect to the first axis 90. For example, the angle between each of the second axes associated with the symbol displays are equal (i.e., 60 degrees). In another embodiment illustrated in FIG. 3B, each of the symbol displays 104 are positioned on different second axes which each intersect and are transverse to the substantially horizontal first axis 90. In this embodiment, the angles between each of the second axes are different and can vary. For example, the angle between second axes 92*d* and 92*e* is greater than the angle between second axes 92*f* and 92*g*. It should be appreciated that the symbol displays may be positioned at any suitable angle with respect to the first axis 90 to vary the positions of the second axes and thereby the first axis.

Referring now to the FIGS. 4 to 8, one embodiment of the present invention is directed to a gaming device 10 having a secondary display such as a mechanical display or mechanical topper unit 100 including a substantially horizontal first axis 90 and a plurality of movable symbol displays 104 each positioned on second axes which each intersect and are transverse to the first axis 90. In one embodiment, the mechanical display 100 includes a main housing 102, a display assembly 103 connected to the main housing, and a front cover 112 connected to the main housing. The main housing 102 encloses and provides support for the display assembly 103. The display assembly 103 is mounted in the main housing 102 and includes the rotatable symbol displays 104 which indicate one or more symbols in a game or games. The display assembly 103 also includes a drive assembly 149 having a plurality of actuators which cause each of the symbol displays to independently rotate. The front cover 112 is connected to the front of the main housing 102 and helps to prevent dust or other particles from accumulating on the display assembly 103 or other components of the mechanical display. The front cover 112 also protects the internal components of the mechanical display from being damaged by players.

In one embodiment, the main housing 102 is connected or attached to the top of the cabinet gaming device 10. In another embodiment, the main housing 102 is separate from the cabinet of the gaming device 10 and positioned at a location viewable by the player. In the illustrated embodiment, the main housing 102 includes a generally rectangular shape with a rounded top surface. It should be appreciated that the main housing 102 may be any suitable size or shape.

In the illustrated embodiment, the display assembly 103 includes a display housing 109 and a symbol display mechanism 110 connected to the display housing. The display housing 109 includes a display frame 114 and a display support 116 suitably connected to the display frame. The display frame 114 has a generally circular or cylindrical shape. It should be appreciated that the display frame 114 may be manufactured in any suitable size and shape. The display frame 114 also includes a plurality of connector plates 128 which position and connect one or more light sources or illumination devices as described below. The display support 116 supports and positions the cylindrical display frame 114 in a desired position inside the main housing 102. Specifically, the display support 116 and the attached frame 114 are positioned and mounted inside the main housing 102 using suitable connectors or fasteners.

Figure 8:
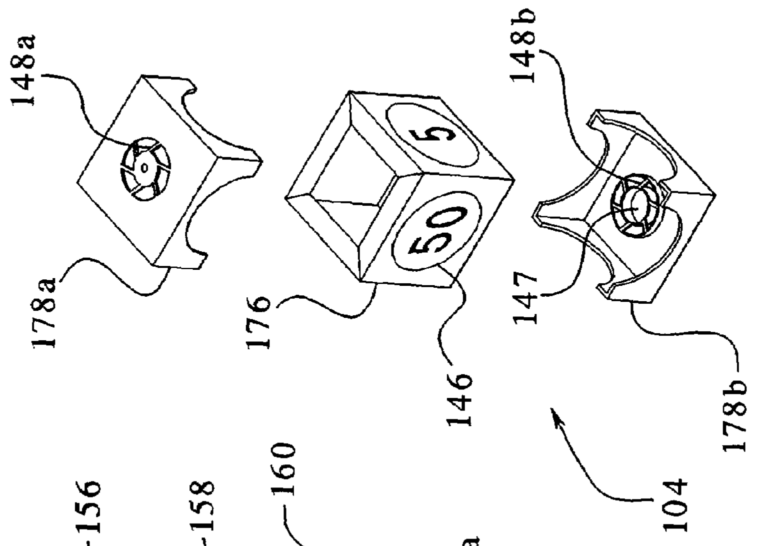
FIG. 8 is an exploded perspective view of the rotatable display device of the embodiment of the present invention of FIG. 4.

The symbol display mechanism 110 includes a plurality of movable symbol displays 104 which are positioned in a generally circular pattern about the center of the symbol display mechanism. For purposes of the present invention, generally circular includes oval and like configurations. It should be appreciated that the symbol displays may be positioned in other suitable positions in accordance with the present invention. In one embodiment, each of the symbol displays 104 includes a display member 176, a top cover 178*a* and a bottom cover 178*b*. In this embodiment, the display member 176 has a generally cubic shape and includes a plurality of symbol panels 146 as illustrated in FIG. 8. It should be appreciated that the symbol displays 104 may be any suitable size and shape. The display members 176 and specifically the symbol panels 146 each includes one or more symbols. The symbols may represent awards, values, free spins, free games, game elements or any suitable outcome.

In the illustrated embodiment, the symbol panels 146 display a symbol or symbols which represent an award or awards to a player in a game. The award panels are manufactured using a substantially translucent material such as glass or a translucent plastic. It should be appreciated that the symbol panels 146 may be manufactured using any suitable translucent material, any substantially translucent material or other suitable materials In the illustrated embodiment, the symbol panels 146 include symbols or awards such as the award values fifty and five shown in FIG. 8. In one embodiment, the symbol panels are positioned on the symbol displays such that the symbol panels and specifically, the symbols on the symbol panels, are viewable and readable by a player. Therefore, the symbol panels on each of the symbol displays are positioned according to the particular angle of each of the symbol displays (i.e., the angle of each of the second axes associated with the symbol displays) with respect to the first axis 90 so that the symbols on the symbol panels are readable by the player.

The top cover 178*a* is attached to the top of the display member 176 by connecting the top cover to the display member using a compression fit, snap fit, friction fit or any other suitable connection method. The bottom cover 178*b* is similarly attached or connected to the bottom of the display member 176. The top cover 178*a* and the bottom cover 178*b* include corresponding cooling mechanisms 148*a* and 148*b*, respectively. The cooling mechanisms 148*a* and 148*b* are adapted to cause air to enter and circulate within each of the symbol displays 104 or alternatively, move out of the symbol displays, when the symbol displays are moving or rotating in a game. The air circulated inside the symbol displays 104 assists in cooling the light source or illumination device mounted in each of the symbol displays 104 as described below. The circulated air also aids in cooling other moving components of the award displays. In one embodiment, the cooling mechanisms 148*a* and 148*b* include at least one louver, which is adapted to direct air into or out of each of the symbol displays. In another embodiment, the cooling mechanisms include at least one fan having at least one fan blade adapted to direct air into each of the symbol displays. It should be appreciated that a fan, a louver or any suitable type of cooling mechanism may be employed on the symbol displays to cool the interior or inside of the symbol displays or in alternative embodiments, cooling may be unnecessary.

In one embodiment, each of the symbol displays 104 include a plurality of symbol panels 146 having at least one symbol. It should be appreciated that each of the symbol panels may include one symbol or several symbols. In one embodiment, a plurality of the symbol panels 146 include different symbols representing different awards. In another embodiment, all the symbol panels 146 include different symbols. It should be appreciated that any suitable symbols or number of symbols may be included on the symbol panels 146 on the symbol displays 104 as described above.

In one embodiment, each of the symbol displays 104 are moved or rotated by a drive assembly 149. The drive assembly 149 includes a motor frame 150, a plurality of motor mounting brackets 152 connected to the motor frame, a plurality of display motors 158 and position sensors 160 connected to each of the mounting brackets 152, and an indicator motor 168 and an indicator position sensor 174 which are connected to the center of the motor frame 150.

In one embodiment, each of the display motors 158 include actuators or motors such as an electric motor, a stepper motor, a servo motor or any suitable actuator or motor. The motors 158 are mounted to each of the mounting brackets 152 using suitable connectors or fasteners. Specifically, the mounting brackets 152 are positioned and secured to the motor frame 150 so that drive members 144 extend along the different second axes as shown in FIGS. 3A and 3B. As described above, the different second axes each intersect and are transverse to the substantially horizontal first axis 90. In one embodiment, each of the motors 158 are positioned at different angles with respect to the motor frame 150 and extend through an opening defined in the middle of each of the mounting brackets 152. The symbol displays 104 are connected to one end of the drive members 144 and thereby are positioned on the different second axes 92 described above. In one embodiment, each of the motors are powered by a suitable power source (not shown) which causes the drive members 144 to move or rotate about the second axes 92 and thereby moves or rotates each of the symbol displays 104 about the different second axes. It should be appreciated that the actuators or motors 158 may move continuously, intermittently or in any suitable manner.

In one embodiment, a plurality of position sensors 160 are connected to or attached to the bottom of each of the motors. The position sensors 160 rotate in unison with the corresponding symbol displays 104 attached to each of the motors 158 to communicate the position of each of the symbol panels 146 to the processor. Specifically, as shown in FIG. 7, each of the position sensors 160 includes a plurality of slots 175. The slots 175 are aligned with each of the symbol panels 146 on the symbol displays 104. For example, the symbol display 104 shown in FIG. 8 includes four symbol panels 146 and the corresponding position sensor 160 shown in FIG. 6 includes four slots 175*a*, where each slot is aligned with one of the symbol panels. A position sensing device (not shown) such as a suitable infrared emitter and receiver combination is used to sense the location of the slots during the rotation of the symbol displays. In particular, the infrared emitter is positioned on one side of the position sensor and the receiver is positioned on the other side of the receiver. The infrared emitter generates an infrared beam projected at the position sensor 160 and specifically, at the portion of the position sensor 160 including the slots. The receiver receives the infrared beam when the beam is unobstructed by the body of the position sensor, or in other words, when the beam passes through one of the slots. The position sensors 160 communicate the position of the symbol panels on each of the symbol displays to the processor so that the processor can control the movement of the symbol displays to display one or more of the symbols indicated on the symbol panels to a player.

In the illustrated embodiment, the symbol display mechanism 110 includes a symbol indicator mechanism 106. The symbol indicator mechanism 106 generally includes a movable symbol indicator such as an arrow or pointer 139 which is positioned adjacent to the symbol displays 104 to indicate one or more of the displayed symbols on the symbol displays. In one embodiment, the symbol indicator mechanism includes an edge-lit display such as the edge lit display described in U.S. Publication No. 2003/0064799 A1. In this embodiment, the symbol indicator mechanism includes an illumination device board such as the light emitting diode ("L.E.D.") board 138 which is connected to the front of the drive assembly 149. An indicator mounting collar 141 is then attached to the center of the L.E.D. board 138. The mounting collar 141 enables the other components of the indicator assembly to be mounted to the front of the drive assembly. An indicator plate 106 is attached to the mounting collar 141 using suitable connectors. In one embodiment, the indicator plate 106 is a substantially transparent and translucent plate such as an acrylic plate and includes the arrow or pointer 139 which is etched or inscribed in the acrylic plate 106. It should be appreciated that the plate 106 may be made using acrylic, glass or any other suitable material. It should be appreciated that any other suitable design or images may be etched or inscribed in the acrylic plate 106. In one embodiment, a plurality of L.E.D. light sources or lights are positioned and suitably connected about the perimeter of the L.E.D. board 138. The L.E.D. lights direct light into the edge of the acrylic plate 106. The light enters the edge of the acrylic or other suitable plate 106 and refracts from the etched or inscribed portions of the acrylic or other suitable plate such as the indicator or pointer 139. The refracted light illuminates the etched portions of the acrylic plate 106 and enables a player to view only the etched portions on the plate. It should be appreciated that the L.E.D. lights on the L.E.D. board 138 may be any suitable L.E.D. lights and may include any suitable color or colors.

In another embodiment, one or more additional independent symbol indicators (not shown) are positioned adjacent to the symbol displays to indicate one or more of the symbols on the symbol displays. In one aspect of this embodiment, the additional symbol indicator or indicators are positioned on and are movably connected to the center hub or end cover 118 (described below). In another aspect of this embodiment, the additional symbol indicator or indicators are positioned on and are movably connected to the acrylic plate 106 and rotate in unison with or independently of the pointer 139. In a further embodiment, the additional symbol indicator or indicators are positioned adjacent to and are movably connected to the main housing 102. In this embodiment, the symbol indicator or indicators move about the perimeter of the housing and indicate one or more symbols on the symbol displays. It should be appreciated that the one or a plurality of the symbol indicators may move in the same direction, different directions or in any suitable combination of directions.

After the acrylic plate 106 is attached to the mounting collar 141, a front display cover 124 is mounted over the acrylic plate 106 and the L.E.D. board 138 to protect the acrylic plate 136 and the L.E.D. board 138. The front display cover 124 is secured to the drive assembly using a suitable fastener. The center hub or end cover 118 includes a securing member 140 which extends transversely from the rear surface of the center hub 118 and inserts into corresponding openings on the acrylic plate 106 and the mounting collar 141. Specifically, the securing member 140 includes a threaded portion which screws into a corresponding threaded receptacle or opening 199 on the rear cover plate 130.

Figure 5A:
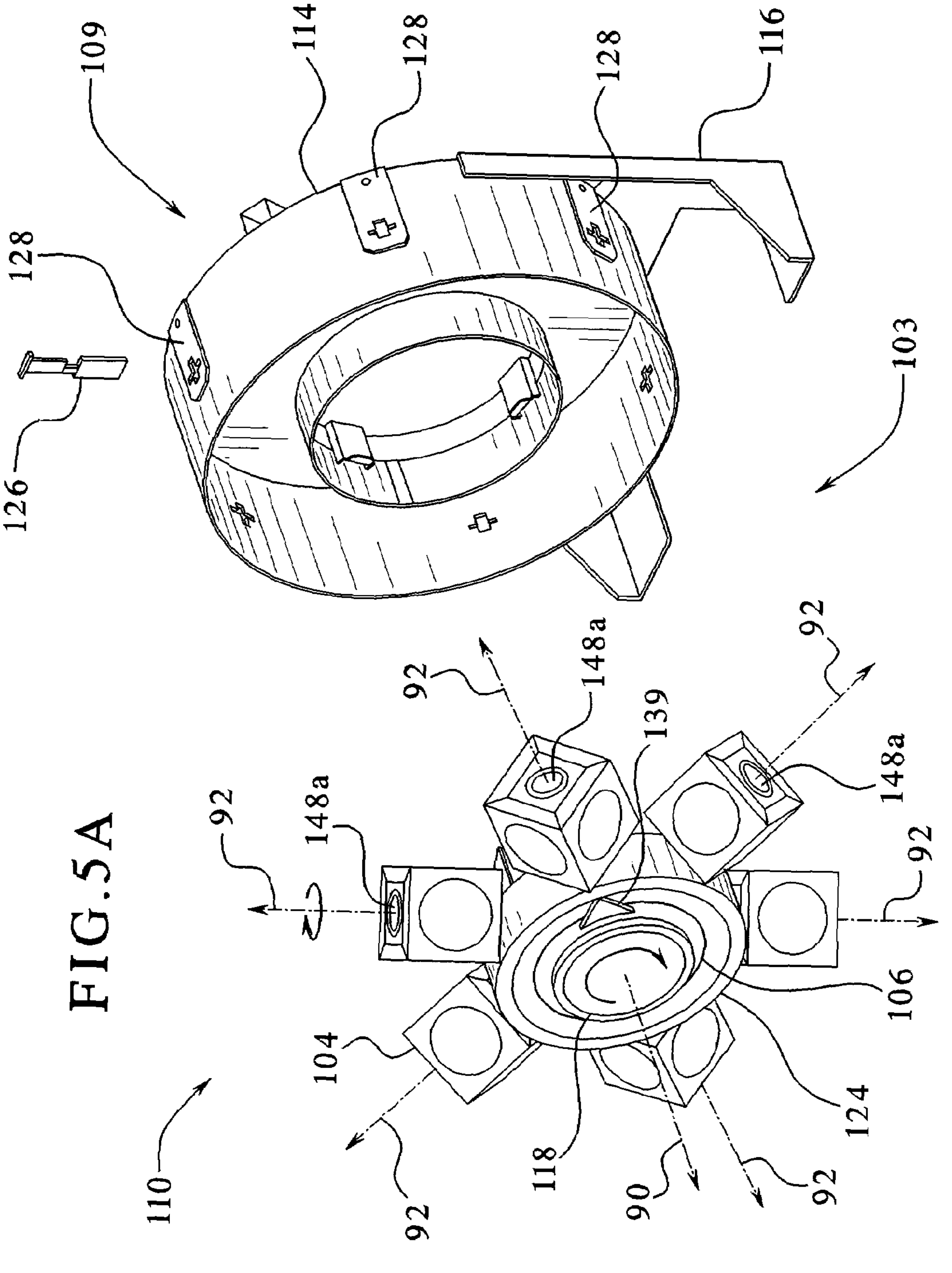
FIG. 5A is an exploded front perspective view of the display assembly of the embodiment of the present invention of FIG. 4.
Figure 6A:
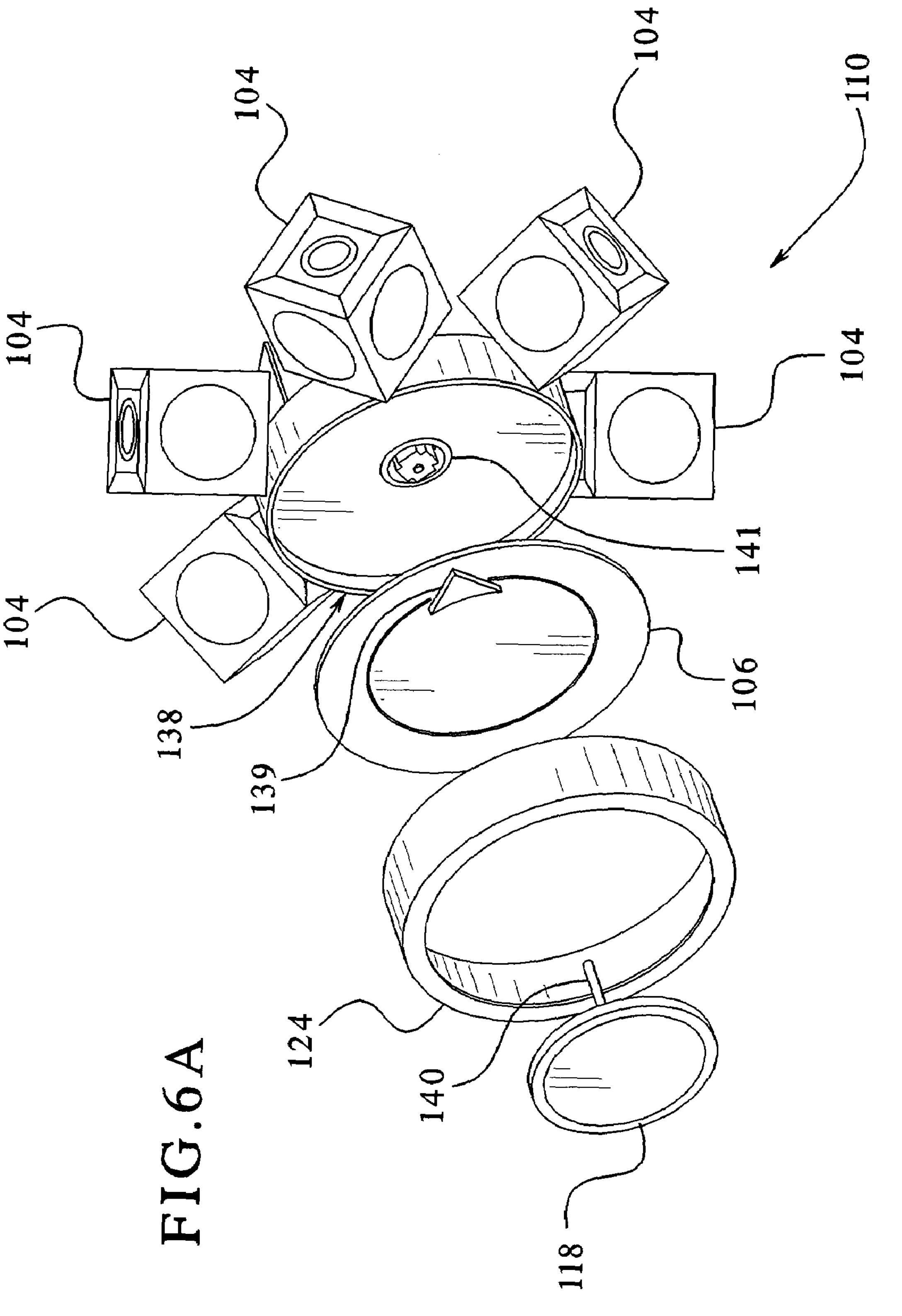
FIG. 6A is an exploded front perspective view of the award display mechanism of the embodiment of the present invention of FIG. 4.
Figure 6B:
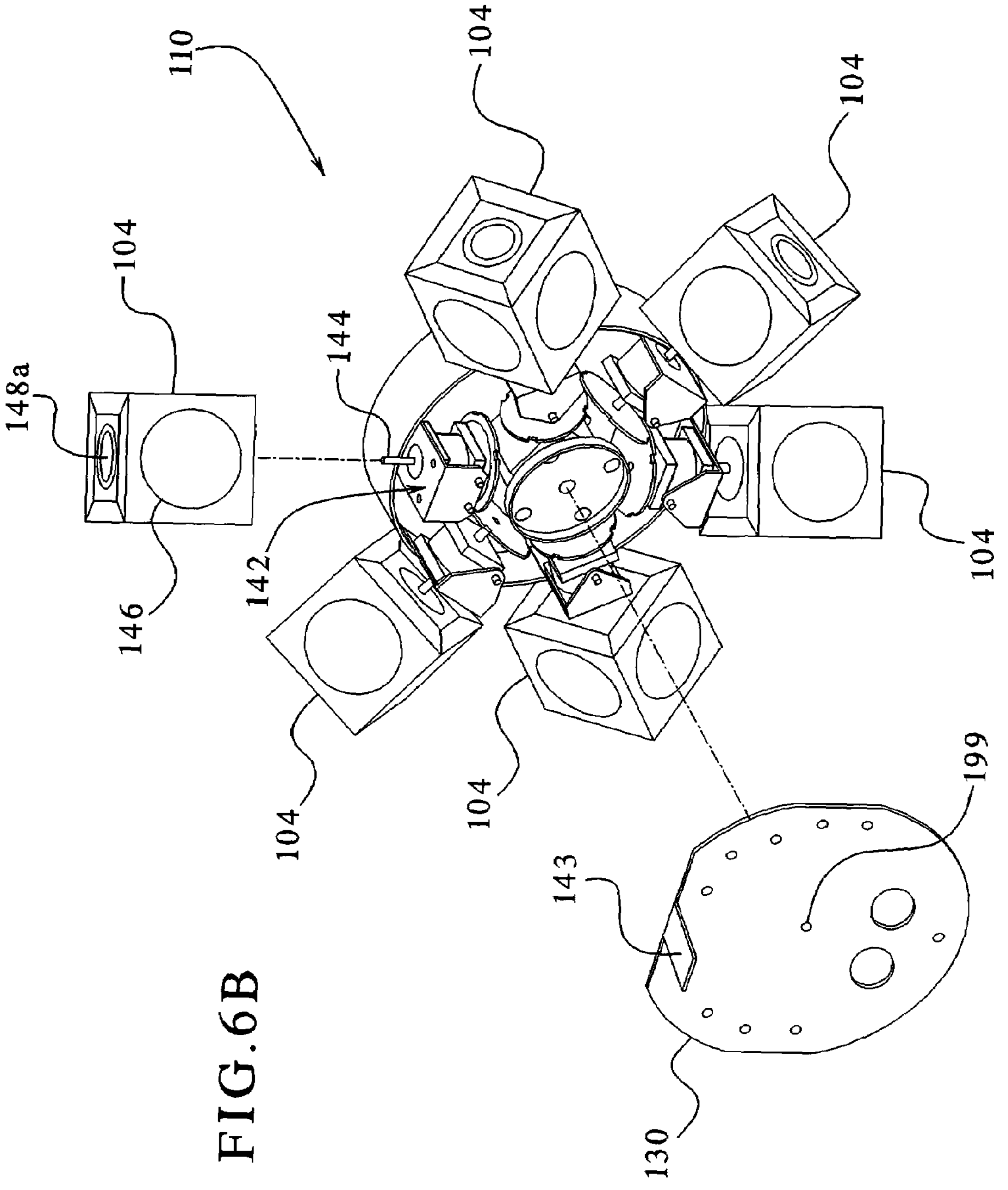
FIG. 6B is a rear exploded perspective view of the award display mechanism of FIG. 6A.
Figure 7:
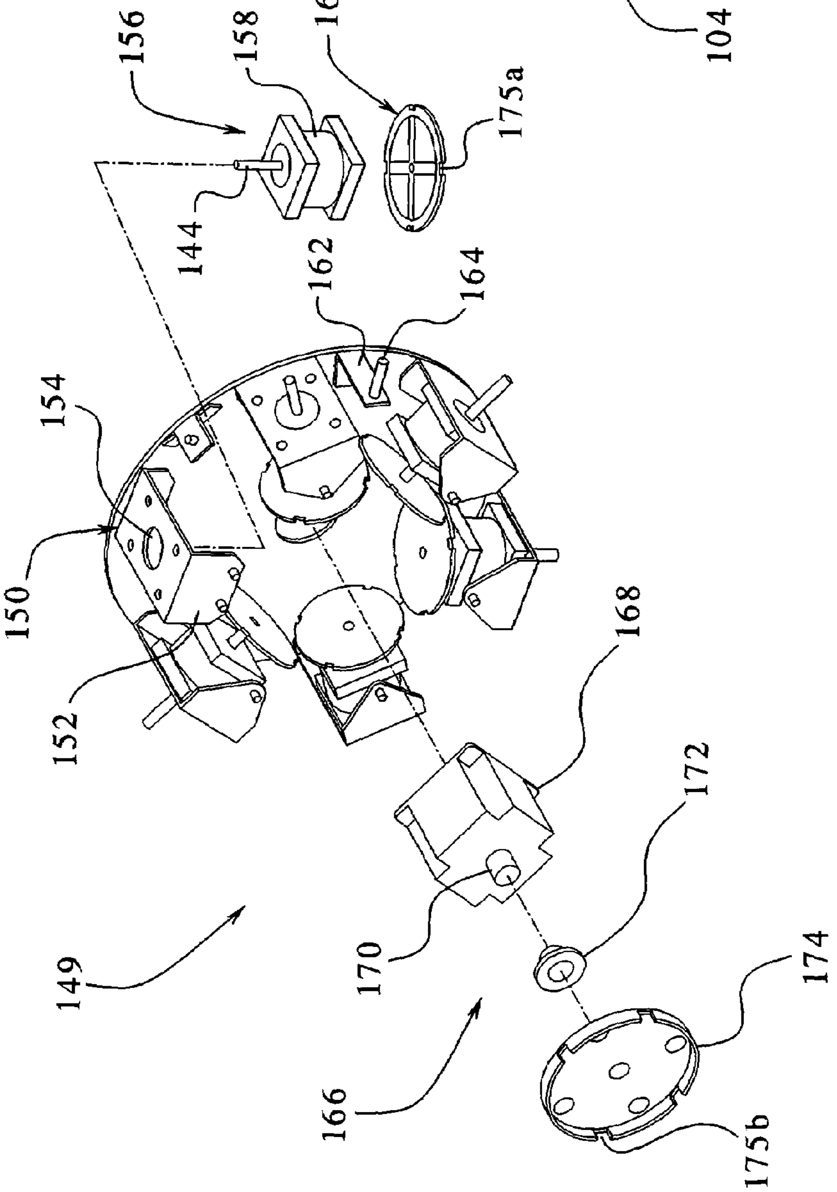
FIG. 7 is an exploded front perspective view of the drive assembly of the embodiment of the present invention of FIG. 4.

In one embodiment, an indicator motor 168 is connected to the center of the motor frame 150 as shown in FIG. 6. The indicator motor 168 is powered by a suitable power source (not shown). The indicator motor 168 drives or rotates the symbol indicator mechanism or indicator mechanism 106 and specifically, rotates the indicator or pointer 139 about the first axis 90 which is transverse to and extends away from the center of the front side or surface of the indicator mechanism as shown in FIG. 5A. In one embodiment, the indicator 139 is rotated in a clockwise direction about the first axis 90. In another embodiment, the indicator 139 is rotated in a counter-clockwise direction about the first axis 90. It should be appreciated that the indicator may be rotated in a suitable direction or combination of directions about the first axis.

In one embodiment, a mounting collar 172 is suitably mounted to the motor shaft 170 on the indicator motor 168. An indicator position sensor 174 is connected or attached to the mounting collar 172. Similar to the position sensors 160 on each of the display motors 158, the position sensor 174 communicates the radial position of the indicator mechanism 106 to the processor by using a suitable infrared emitter and receiver and the slots 175*b* on the position sensor. The processor can therefore control the movement and position of the indicator mechanism 106. It should be appreciated that any suitable position sensor may be employed by the present invention.

Figure 5B:
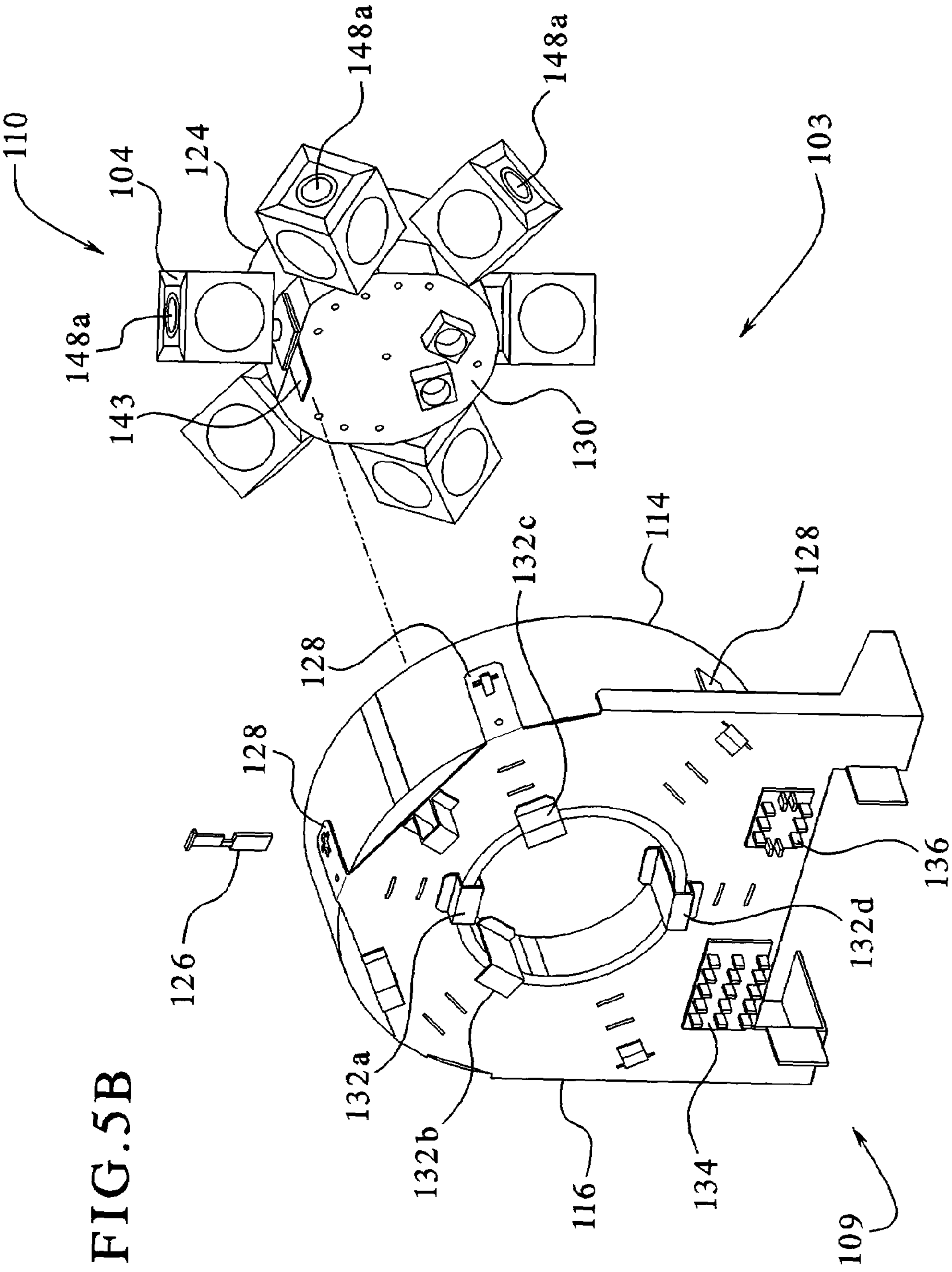
FIG. 5B is a exploded rear perspective view of the display assembly of the embodiment of FIG. 5A.

In one embodiment, a rear display cover 130 is connected or attached to the back side of the drive assembly 149. The rear display cover 130 enables the award display mechanism 110 to be connected to the main housing 102. Specifically, the rear display cover 130 includes a support flange 143 which is integrally formed with the rear display cover and extends transversely from the top edge of the cover. As shown in FIG. 5B, the support flange 143 is positioned adjacent to and on top of a corresponding mounting bracket 132*a* connected to the display support 116 of the display housing 109. The support flange 143 supports the award display mechanism 110 as the award display mechanism is mounted to the display housing 109. In one embodiment, the award display mechanism 110 is mounted and secured to the mounting brackets 132*b*, 132*c* and 132*d* attached to the display housing 109. The mounting brackets 132*b*, 132*c* and 132*d* are connected to the award display mechanism using suitable connectors or fasteners.

Referring now to FIGS. 5A and 5B, in one embodiment, a plurality of illumination devices 126 are mounted in corresponding openings in the connector plates 128 on the display frame 114. The illumination devices 126 fit into the openings on the connector plates 128 and are inserted into the openings 148*a* on each of the symbol displays 104 as shown in FIGS. 5B and 8. In one embodiment, each of the illumination devices 126 include one or more L.E.D.s which are controlled by the processor and illuminate the interior of each of the symbol displays 104. It should be appreciated that the illumination devices may be any suitable light sources or illumination devices desired by the game manufacturer. In one embodiment, a plurality of the illumination devices are adapted to produce different colors. It should be appreciated that the illumination devices may include the same color, different colors or any suitable combination of colors.

In one embodiment, each of the illumination devices 126 includes variable light settings such that the illumination devices may be set to fully illuminate, dimly illuminate, or not illuminate the interior of each of the symbol displays 104. It should be appreciated that any suitable light settings may be employed by the illumination devices. In one embodiment, when a displayed award symbol on one of the award displays is indicated by the indicator mechanism in a game, the processor causes the illumination device in that award display to fully illuminate or in other words, the processor increases the intensity of the light emitted from that illumination device. The processor then causes the other illumination devices in the other award displays to dim or decrease the light intensity emitted by those illumination devices. It should be appreciated that any suitable light intensity or light intensities may be employed in a game or game to indicate an award symbols or any other game function.

In one embodiment, each of the display motors 158 and the indicator motor 168 are connected to the main housing 102 using suitable wires or wiring assemblies. The wiring or wiring assemblies are connected to the first circuit panel and/or the second circuit panel 134 and 136, respectively. The first and second circuit panels 134 and 136 distribute the electrical power to the electrical components in the mechanical display using suitable wiring or wiring connectors.

In one alternative embodiment, the main housing 102 includes a video display device 108 which is connected to the main housing 102 using suitable connectors. The video display device 108 displays instructions, text or messages to a player during a game. The video display device 108 is in communication with the processor which controls the information displayed by the video display device. It should be appreciated that the video display device 108 may be any suitable video display or video monitor desired by the game manufacturer.

It should be appreciated that in certain embodiments, the present invention provides a gaming device including a game operable upon a wager made by a player, a bonus award designator associated with the game and a plurality of bonus value carriers positioned or placed in proximity to or adjacent to the bonus award designator. The bonus award designator includes a pointer or other suitable indicator which rotates in a generally horizontal plane where the bonus value carriers are positioned in a generally circular pattern surrounding the bonus award designator. In addition, one or more of the bonus value carriers include a plurality of generally flat outer surfaces where each of the outer surfaces includes at least one of a plurality of award value indicators. The bonus award designator designates at least one of the bonus value carriers as the bonus value carrier that displays the award value to be awarded or provided to a player in the game.

In another embodiment, the gaming device includes a rotating pointer and a plurality of bonus value carriers disposed in a generally circular pattern surrounding the pointer. The bonus value carriers include a plurality of outer surfaces where each of the outer surfaces has an award value indicator. In one embodiment, the pointer and the bonus value carriers rotate on axes lying in different planes.

In another embodiment, the gaming device includes a housing and a plurality of indicia carriers movably connected to the housing. In this embodiment, each of the indicia carriers includes a plurality of indicia, where the distance between the indicia carriers is non-uniform and the indicia carriers are positioned in a generally circular pattern about the housing. In one embodiment, the axes of symmetry of at least two of said indicia carriers do not lie-on the same line.

In another embodiment, the gaming device includes a housing and a plurality of indicia carriers movably connected to the housing. In this embodiment, each of the indicia carriers include a plurality of generally upright indicia so that the indicia are viewable and readable by a player. Additionally, the axes of symmetry of the indicia are non-uniform with respect to the axes of symmetry of the indicia carriers.

In another embodiment, a method of operating the gaming device includes first rotating a symbol indicator about a first axis. The symbol indicator is then stopped. One or more bonus value carriers are rotated about second axes each lying in different planes than the plane of the first axis. In this embodiment, the bonus value carriers include a plurality of generally flat outer surfaces where each of the surfaces have an award value indicator.

It should be appreciated that the various components of the present invention described above may be connected or attached using any suitable connectors, fasteners or any suitable connecting methods. In addition, it should be appreciated that the above components and parts may be manufactured using metal, plastic or any other suitable material.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a game operable upon a wager by a player;

a cabinet;

a housing connected to the cabinet, said housing including a substantially horizontal first axis which extends from the rear of the housing to the front of the housing;

at least one symbol indicator mounted in the housing and operable to move about the first axis;

a plurality of symbol displays each independently rotatably mounted in said housing, each of said symbol displays including at least one symbol and extending substantially along and rotatable about a different separate second axis, wherein each second axis extends from and intersects the first axis, wherein at least one second axis intersects at least one other different separate second axis, and wherein upon the occurrence of a triggering event in the game, each of the symbol displays independently rotates and displays one of the symbols and the at least one symbol indicator indicates at least one of the displayed symbols on the symbol displays; and an award adapted to be provided to the player, wherein the award is based on at least one of the indicated symbols on the symbol displays after the symbol displays stop rotating.

2. The gaming device of claim 1, wherein at least two of the symbol displays extend substantially along the same second axis.

3. The gaming device of claim 1, wherein at least two pairs of the symbol displays extend substantially along different second axes.

4. The gaming device of claim 1, which includes an actuator connected to the housing, wherein each of said symbol displays are movably connected to said actuator.

5. The gaming device of claim 1, which includes a plurality of actuators connected to the housing, wherein each of said symbol displays are movably connected to at least one of said actuators.

6. The gaming device of claim 1, wherein the symbol includes at least one of the following symbols selected from the group consisting of: at least one award, at least one modifier, at least one free spin, at least one free game, and at least one game element.

7. The gaming device of claim 1, which includes at least one actuator connected to the housing, wherein the symbol indicator is positioned adjacent to the symbol displays and is movably connected to the actuator, said actuator operable to move the symbol indicator about the first axis to indicate one of the displayed symbols on the symbol displays.

8. The gaming device of claim 1, which includes at least one illumination device connected to the housing and positioned inside each of the symbol displays.

9. The gaming device of claim 8, wherein all of the illumination devices are the same color.

10. The gaming device of claim 8, wherein at least two of the illumination devices are different colors.

11. The gaming device of claim 1, which includes a video display device connected to the housing.

12. The gaming device of claim 1, wherein each of the symbol displays includes at least one cooling mechanism.

13. The gaming device of claim 12, wherein each cooling mechanism includes at least one louver.

14. The gaming device of claim 12, wherein each of the cooling mechanisms includes at least one blade.

15. The gaming device of claim 1, wherein at least one second axis is positioned at a right angle to (1) the first axis or (2) at least one other second axis.

16. A gaming device comprising:

a game operable upon a wager by a player;

a cabinet;

a housing connected to the cabinet, said housing including a substantially horizontal first axis which extends substantially from the rear of the housing to the front of the housing;

at least one symbol indicator mounted in the housing and operable to move about the first axis;

a plurality of independently rotatable symbol displays mounted in said housing, each of said symbol displays including at least one symbol and extending substantially along and rotatable about a different separate second axis, wherein each second axis extends from and intersects the first axis and wherein at least one second axis intersects at least one other different separate second axis; and a processor operable after a triggering event in the game to independently rotate each of the symbol displays about the second axis associated with the symbol displays, stop the symbol displays to display at least one symbol on the symbol displays, cause the symbol indicator to indicate at least one of the displayed symbols on the stopped symbol displays and provide an award based on any of the indicated symbols on the symbol displays.

17. The gaming device of claim 16, wherein at least two of the symbol displays extend substantially along the same second axis.

18. The gaming device of claim 16, wherein at least two pairs of the symbol displays extend substantially along different second axes.

19. The gaming device of claim 16, which includes an actuator connected to the housing, wherein each of said symbol displays are movably connected to said actuator.

20. The gaming device of claim 16, which includes a plurality of actuators connected to the housing, wherein each of said symbol displays are movably connected to at least one of said actuators.

21. The gaming device of claim 16, wherein the symbol includes at least one of the following symbols selected from the group consisting of: at least one award, at least one modifier, at least one free spin, at least one free game and at least one game element.

22. The gaming device of claim 16, which includes at least one actuator connected to the housing, wherein the symbol indicator is positioned adjacent to the symbol displays and is movably connected to the actuator, said actuator operable to move the symbol indicator about the first axis to indicate one of the displayed symbols on the symbol displays.

23. The gaming device of claim 16, which includes at least one illumination device connected to the housing and positioned inside each of the symbol displays.

24. The gaming device of claim 23, wherein all of the illumination devices are the same color.

25. The gaming device of claim 23, wherein at least two of the illumination devices are different colors.

26. The gaming device of claim 16, which includes a video display device connected to the housing.

27. The gaming device of claim 16, wherein each of the symbol displays includes at least one cooling mechanism.

28. The gaming device of claim 27, wherein each cooling mechanism includes at least one louver.

29. The gaming device of claim 27, wherein each of the cooling mechanisms includes at least one blade.

30. The gaming device of claim 16, wherein at least one second axis is positioned at a right angle to (1) the first axis or (2) at least one other second axis.

31. A method of operating a gaming device comprising:

(a) independently rotating a plurality of symbol displays mounted in a housing, said housing including a first axis which extends from the rear of the housing to the front of the housing, wherein each of said symbol displays includes at least one symbol and is positioned on and rotatable about a different separate second axis which extends substantially from and intersects the first axis and wherein at least one of the different separate second axes intersects at least one other different separate second axis;

(b) stopping the rotation of the symbol displays to display at least one symbol on each of the symbol displays to a player;

(c) moving at least one symbol indicator about the first axis to indicate at least one of the displayed symbols on the symbol displays; and (d) providing an award to the player, wherein the award is based on at least one of the indicated symbols on the symbol displays.

32. The method of claim 31, wherein the symbol indicator is positioned adjacent to the symbol displays and indicates at least one of the displayed symbols on the symbol displays.

33. The method of claim 32, which includes simultaneously moving the symbol indicator about the first axis and each of the symbol displays about each of the corresponding second axes.

34. The method of claim 32, which includes moving the symbol indicator about the first axis and each of the symbol displays about each of the corresponding second axes at different rotational rates.

35. The method of claim 31, which includes illuminating at least one of the symbol displays using at least one illumination device connected to the housing and positioned inside each of the symbol displays.

36. The method of claim 31, which includes cooling each of the symbol displays using at least one cooling mechanism mounted on said symbol displays.

37. The method of claim 31, which includes cooling each of the symbol displays using at least one louver connected to said symbol displays.

38. The method of claim 31, which includes cooling each of the symbol displays using at least one blade connected to said symbol displays.

39. The method of claim 31, which includes positioning at least one second axis at a right angle to (1) the first axis or (2) at least one other second axis.

40. A gaming device comprising:

a game operable upon a wager by a player;

a cabinet;

a housing connected to the cabinet, said housing including a substantially horizontal first axis which extends from the rear of the housing to the front of the housing;

a refractive light display connected to said housing, said refractive light display including at least one refractive surface which forms a symbol indicator;

at least one light source connected to said housing, said at least one light source operable to direct light into the refractive light display and to illuminate any refractive surfaces in the refractive light display;

a plurality of symbol displays each independently rotatably mounted in said housing, each of said symbol displays including at least one symbol and extending substantially along and rotatable about a different separate second axis, wherein each second axis extends from and intersects the first axis, and wherein upon the occurrence of a triggering event in the game, each of the symbol displays independently rotates and displays one of the symbols and the symbol indicator indicates at least one of the displayed symbols on the symbol displays; and an award adapted to be provided to the player, wherein the award is based on at least one of the indicated symbols on the symbol displays after the symbol displays stop rotating.

41. The gaming device of claim 40, wherein said refractive light display includes a plurality of refractive surfaces which form at least one symbol, image, pattern or design.

42. The gaming device of claim 40, wherein the refractive light display includes a translucent edge-lit material.

43. A method of operating a gaming device comprising:

(a) independently rotating a plurality of symbol displays mounted in a housing, said housing including a first axis which extends from the rear of the housing to the front of the housing, wherein each of said symbol displays includes at least one symbol and is positioned on and rotatable about a different separate second axis which extends substantially from and intersects the first axis and wherein at least one of the different separate second axes intersects at least one other different separate second axis;

(b) stopping the rotation of the symbol displays to display at least one symbol on each of the symbol displays to a player;

(c) illuminating a refractive surface in the form of a symbol indicator using a refractive light display connected to said housing, wherein said refractive light display includes the refractive surface, and wherein at least one light source is connected to said housing and is operable to direct light into the refractive light display, illuminate any refractive surfaces in the refractive light display and indicate at least one of the displayed symbols; and (d) providing an award to the player, wherein the award is based on at least one of the indicated symbols on the symbol displays.

44. The gaming device of claim 43, wherein said refractive light display includes a plurality of refractive surfaces which form at least one symbol, image, pattern or design.

45. The gaming device of claim 43, wherein the refractive light display includes a translucent edge-lit material.

* * * * *

UNITED STATES PATENT AND TRADEMARK OFFICE
CERTIFICATE OF CORRECTION

PATENT NO. : 7,309,285 B2
APPLICATION NO. : 10/658996
DATED : December 18, 2007
INVENTOR(S) : Dennis Nordman et al.

It is certified that error appears in the above-identified patent and that said Letters Patent is hereby corrected as shown below:

IN THE SPECIFICATION:

In Column 3, Line 44 change “a” to --an--.

In Column 5, Line 11 insert --the-- between “,” and “gaming”.

In Column 6, Line 27 insert --the-- between “touching” and “touch”.

In Column 8, Line 5 change “preferable” to --preferably--.

In Column 9, Line 40 change “a” to --as--.

In Column 11, Line 34 change “a” to --an--.

In Column 13, Line 11 insert --.-- between “materials” and “In”.

In Column 17, Line 53 change “lie-on” to --lie on--.

Signed and Sealed this

Fifteenth Day of July, 2008

JON W. DUDAS
*Director of the United States Patent and Trademark Office*